United States Patent [19]

Martin et al.

[11] Patent Number: 5,425,668
[45] Date of Patent: Jun. 20, 1995

[54] POULTRY SLAUGHTERING MACHINE

[75] Inventors: Eugene G. Martin, Denver; Steven P. Sorensen, Ephrata; Duane Newswanger, Conestoga, all of Pa.

[73] Assignee: Foodcraft Equipment Company, Lancaster, Pa.

[21] Appl. No.: 309,597

[22] Filed: Sep. 21, 1994

[51] Int. Cl.⁶ .......................... A22B 3/08; A22C 21/00
[52] U.S. Cl. ........................................ 452/63; 452/54
[58] Field of Search ................... 452/63, 67, 53, 54, 452/64, 179

[56] References Cited

U.S. PATENT DOCUMENTS

| | | |
|---|---|---|
| 1,410,640 | 3/1922 | Baker . |
| 2,129,968 | 9/1938 | Sargent et al. ............... 452/63 |
| 2,152,082 | 3/1939 | Onorato et al. ............... 452/63 |
| 2,210,377 | 8/1940 | Onorato et al. . |
| 2,874,402 | 2/1959 | Boykin . |
| 3,243,842 | 4/1966 | Norwood . |
| 3,475,785 | 11/1969 | Woods . |
| 3,477,092 | 11/1969 | Simmons . |
| 3,514,809 | 6/1970 | Barbour et al. . |
| 3,571,845 | 3/1971 | Martin ............................ 452/63 |
| 3,686,713 | 8/1972 | Lewis . |
| 3,724,029 | 4/1973 | Lewis . |
| 3,724,032 | 4/1973 | Harben, Jr. . |
| 3,737,948 | 6/1973 | Van Mil . |
| 3,765,055 | 10/1973 | Lewis . |
| 3,781,945 | 1/1974 | Taylor . |
| 3,805,328 | 4/1974 | Strandine et al. . |
| 3,833,966 | 9/1974 | Harben, Jr. .................... 452/63 |
| 3,956,794 | 5/1976 | Verbakel . |
| 4,249,285 | 2/1981 | Sheehan et al. ............... 452/63 |
| 4,336,633 | 6/1982 | De Long ....................... 452/63 |
| 4,354,296 | 10/1982 | Robinson ...................... 452/63 |
| 4,894,885 | 1/1990 | Markert ........................ 452/63 |

Primary Examiner—Willis Little
Attorney, Agent, or Firm—Shoemaker and Mattare, Ltd.

[57] ABSTRACT

A poultry slaughtering machine includes a shackle conveyor for carrying a series of birds, suspended by their feet in a predetermined orientation with their breast facing to one side, along a first path, and a head capturing device disposed generally below the shackle conveyor and offset away from the breast side. The capturing device includes a flexible carrier constrained to follow an endless second path, a series of pairs of relatively movable jaws affixed to the endless carrier, and a cam rail for closing each pair of jaws about the neck of a bird. A rotary blade incises major blood vessels of tile neck, but is prevented from cutting the trachea or the spinal cord, and the jaws are opened to release the neck as soon as the cut has been made.

29 Claims, 7 Drawing Sheets

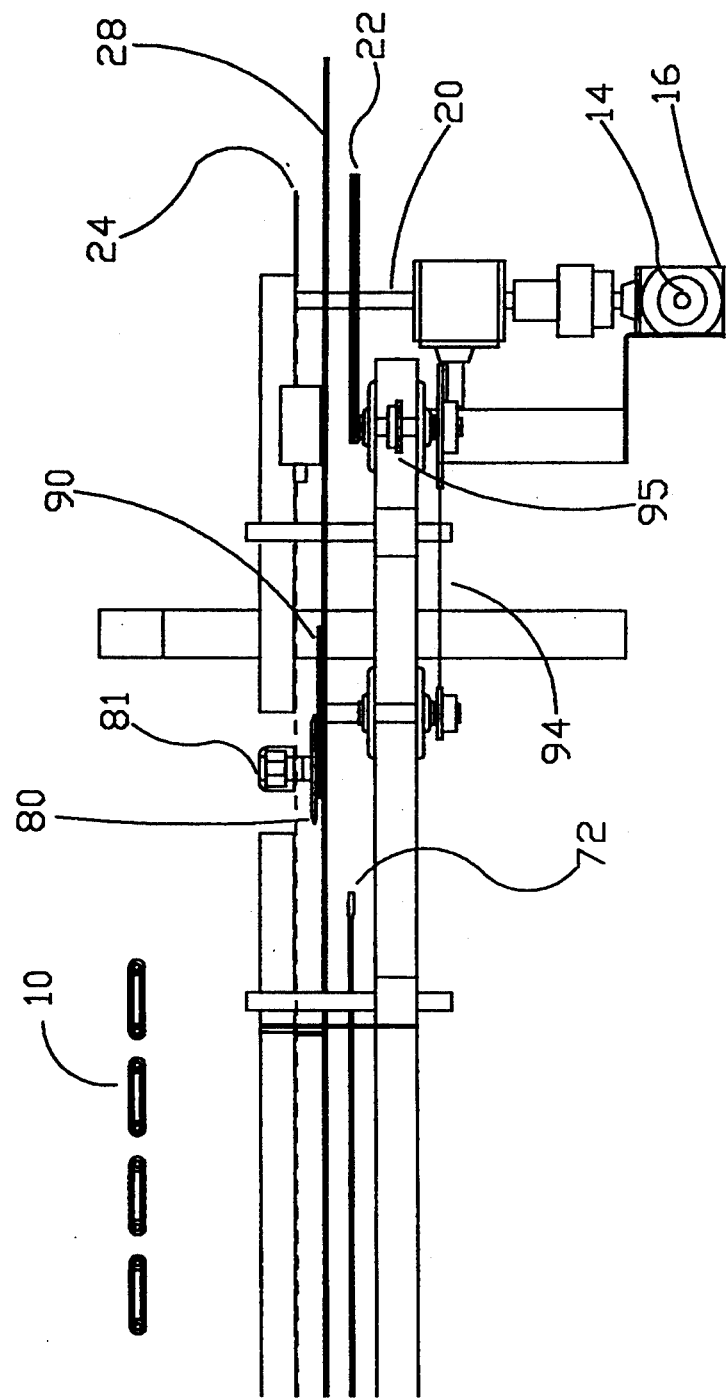

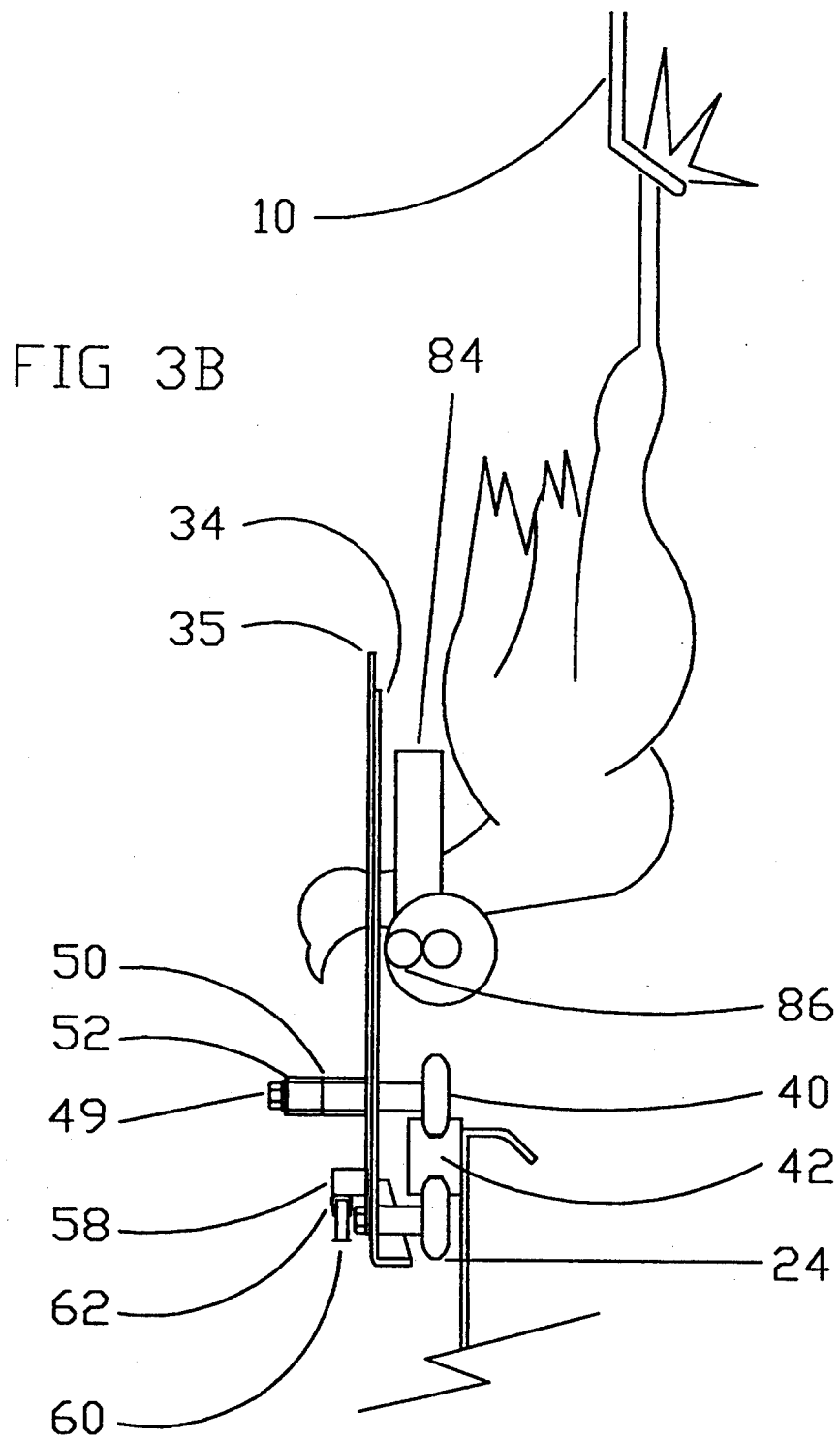

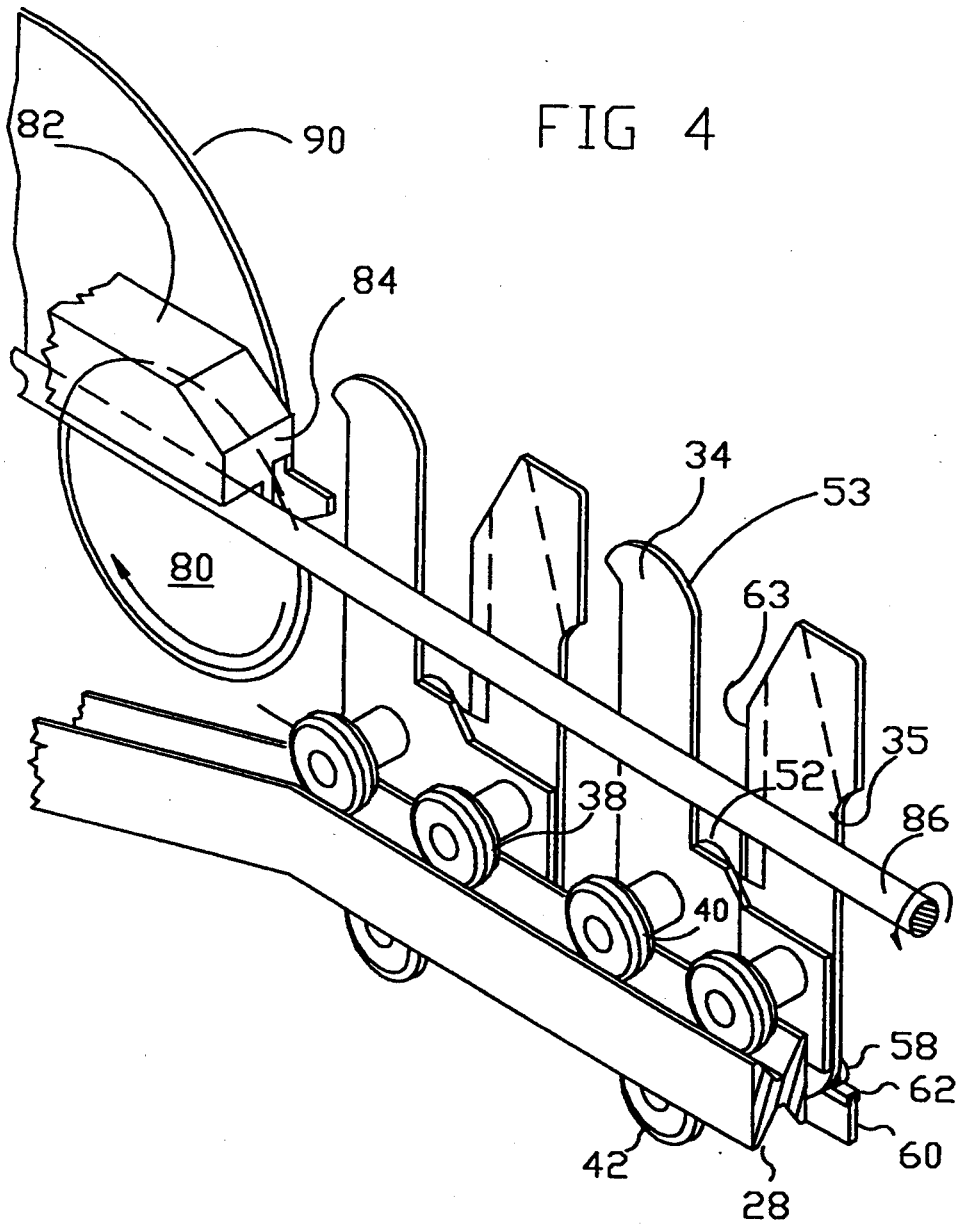

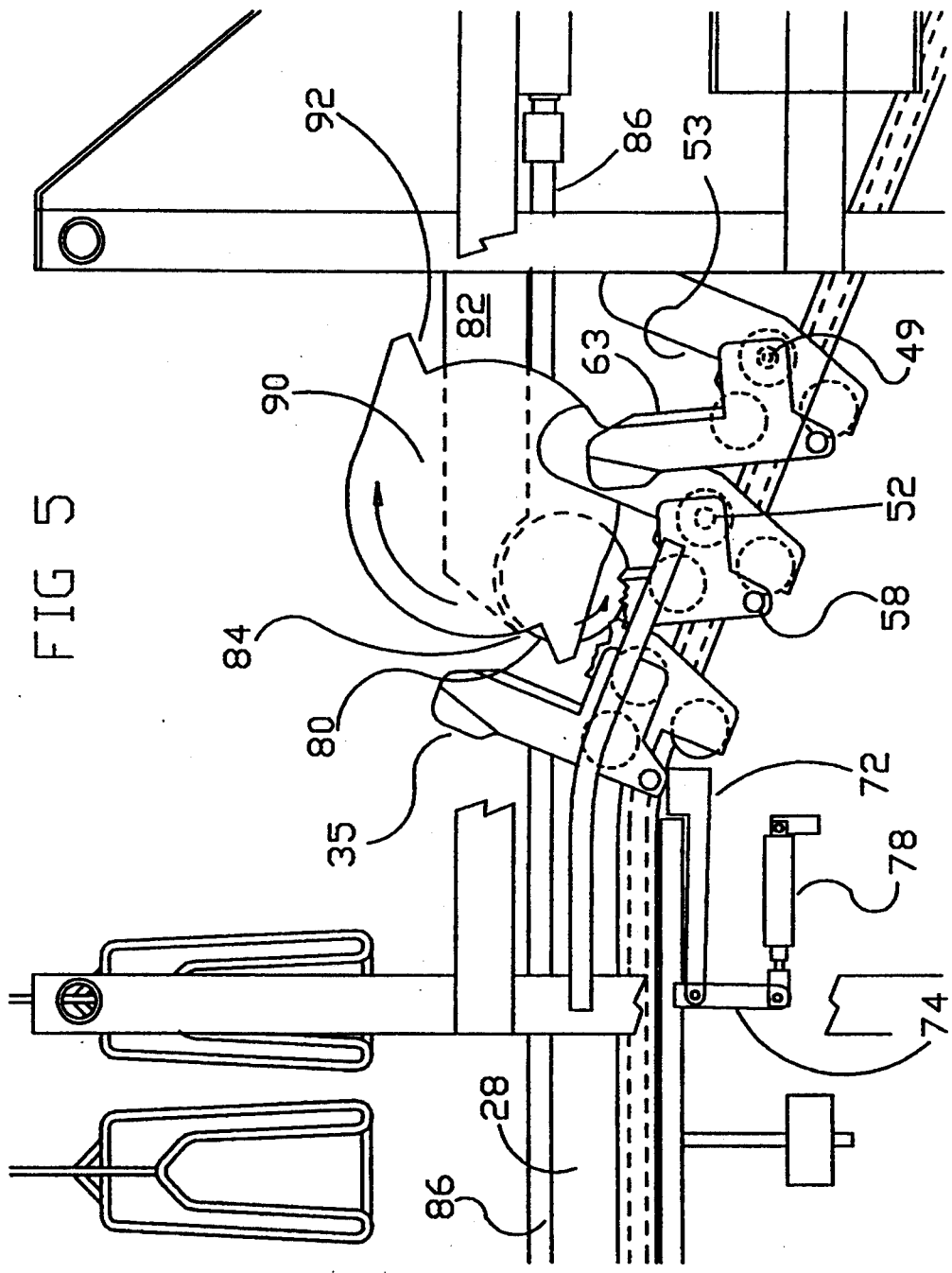

POULTRY SLAUGHTERING MACHINE

BACKGROUND OF THE INVENTION

This invention relates generally to poultry slaughtering.

Today, it is common to "process" (slaughter and butcher) fowl such as chickens in factories devoted to the purpose. Typically, chickens are carried by moving foot shackles first through an electrical stunning apparatus, which immobilizes each bird but does not kill it, and immediately thereafter over a blade which cuts the blood vessels of the neck. The heart assists in removing blood from the circulatory system.

Thorough bleeding is necessary to avoid objectionable dark blood vessels in the meat, so it is best not to decapitate the bird, or otherwise injure the spinal cord initially, since such injuries may arrest the heart prematurely.

Another reason for avoiding injury to the spinal column is that injuring the spinal cord induces shock in the bird, closing the pores of the skin so that the feathers are held tightly, thereby complicating the subsequent feather picking operation. One can compensate for this response by increasing the scalding temperature or duration, but overscalding adversely affects qualities including skin color. Shock also reduces the bleeding rate, as it constricts the blood vessels.

A further consideration is that is important not to cut the trachea, because suffocation can result from blood entering the trachea.

One purpose of electrically stunning chickens is to immobilize them so that an accurate neck incision can be made. However, there are some objections to stunning, on various grounds. One could avoid these objections if one could kill chickens and other fowl automatically, but without requiring an advance electrical stunning step. The problem addressed by this invention is that the necks of birds which have not been are difficult to cut automatically with precision.

Prior inventors have developed a number of devices for immobilizing birds during slaughtering. One such device is disclosed in Martin's U.S. Pat. No. 3,571,845. That device includes a foot shackle conveyor that runs above an endless chain loop moving at about the same speed. The chain supports a series of flat blades, like pickets, between which the bird's heads are captured en route to the cutting blade.

Since the writing of the prior Martin patent, the neck incising operation has become mechanized, freeing workers from this unpleasant task. But because the machinery now used is not as adaptable as the workers it replaced–that is, it cannot alter its blade position to compensate for the movements of individual birds–it is necessary to ensure that the birds are passed over the cutting blades in a fixed, reproducible orientation. It might be thought that a live bird would present a random moving target during this process; however, we have found that birds respond to certain stimuli in predictable ways, and that these responses can be used to improve the operation of killing machinery. This observation has led to certain aspects of the invention described below.

SUMMARY OF THE INVENTION

An object of the invention is to immobilize the head of a bird during slaughtering, so that electrical stunning is not required, but nonetheless, the blood vessels of the neck can be cleanly and accurately cut.

A related object of the invention is to minimize the number of incidents of improper cutting, and thus reduce the need for human intervention in the slaughtering process.

A further object of the invention is to prevent the wings of the bird from interfering with, or becoming caught in, moving parts of the device.

These and other objects are attained by a poultry slaughtering machine including a shackle conveyor for carrying a series of birds, suspended by their feet in a predetermined orientation with their breasts facing to one side, along a first path, and a head capturing device disposed generally below the shackle conveyor and offset away from the breast side. The capturing device includes a flexible carrier constrained to follow an endless second path, a series of pairs of relatively movable jaws affixed to the endless carrier, and a cam rail for closing each pair of jaws about the neck of a bird. While each chicken's neck is captured between a pair of jaws, a rotary blade incises major blood vessels of the neck, without cutting the trachea or the spinal cord. The jaws release the neck immediately thereafter.

Injury to the trachea or spinal cord is avoided by closely confining the head as it approaches the blade, by preventing the head from turning, and by pulling the neck skin and trachea away from the blade as the bird approaches it.

Another aspect of the invention is that, at the upstream end of the device, the bird's breast is progressively engaged by a belt which moves slightly faster than the bird; the bird reacts to this stimulus by withdrawing its wings, keeping them out of the machinery.

BRIEF DESCRIPTION OF THE DRAWINGS

In the accompanying drawings:

FIG. 2 is a top plan view of the downstream portion;

FIG. 3B is a greatly enlarged detail view of a portion of FIG. 3A;

FIG. 4 is a perspective detail view of a pair of jaws for capturing a bird's head; and FIG. 5 is an enlarged view of a portion of FIG. 1B, showing a neck incising blade.

DESCRIPTION OF THE PREFERRED EMBODIMENT

Figure 1A:
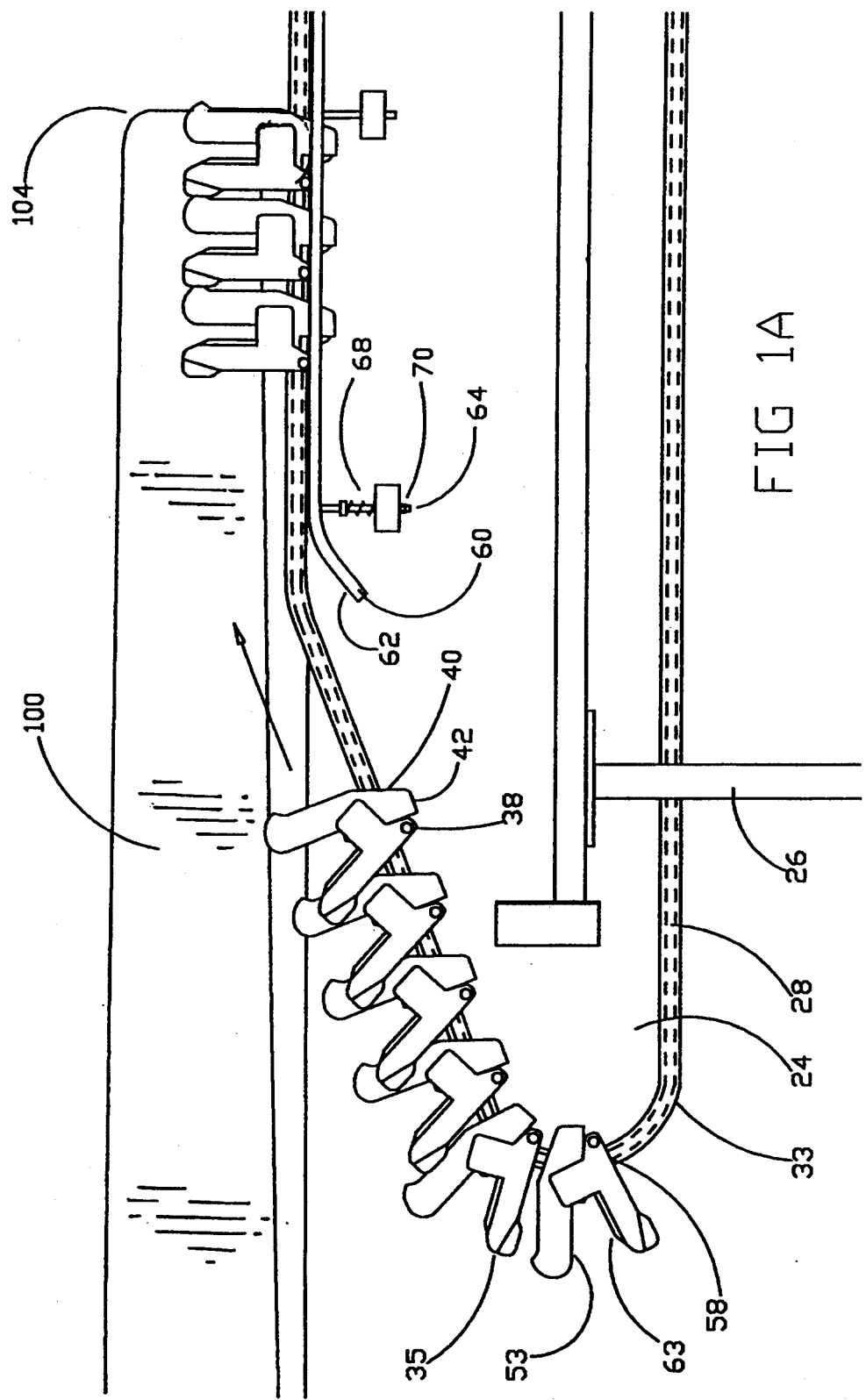
FIGS. 1A and 1B are front elevations of upstream and downstream portions of a poultry slaughtering machine embodying the invention.
Figure 1B:
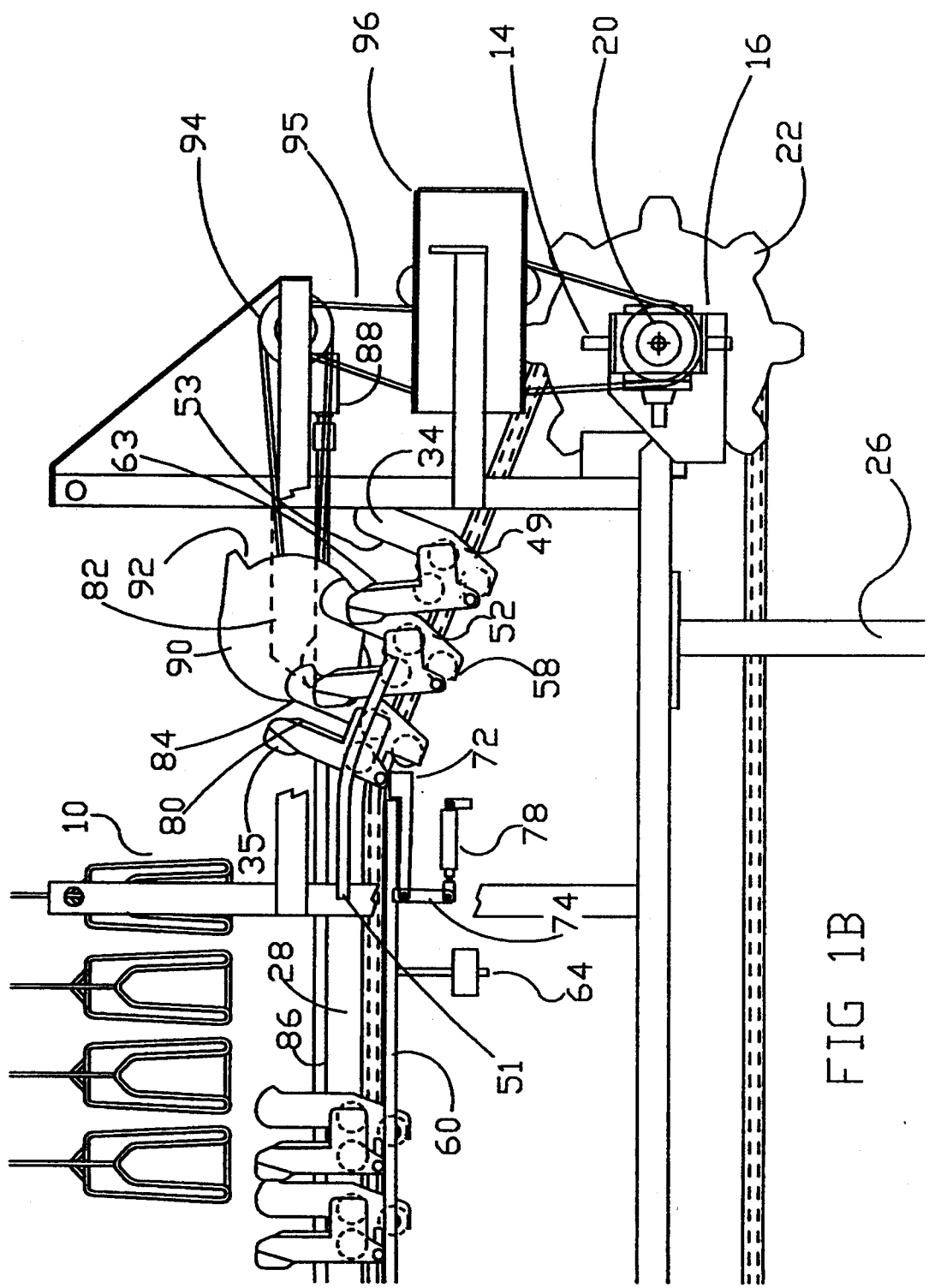

FIGS. 1A and 1B show the front or near side of a poultry slaughtering machine embodying the invention, as seen by the operator. The machine is situated below, and offset to one side of, a conventional overhead shackle conveyor 10 (FIG. 1B) comprising a chain carrying a series of foot shackles along a horizontal path. Power to drive the machine is taken from the shackle conveyor 10 by a power take-off unit (not shown) and delivered via a vertical shaft 14 through a right-angle transfer case 16 to the horizontal axle 20 of a large sprocket 22. This sprocket has a pitch equal to the pitch (shackle-to-shackle spacing) of the overhead conveyor. Six inches is standard for chickens.

A head capturing device disposed generally below the shackle conveyor includes a flexible carrier (preferably, a chain having a corresponding pitch) running on the sprocket; this chain is constrained to follow an endless path around a vertical, trapezoidal plate 24, which is connected to the frame 26 of the machine by bolts.

A monorail track 28 is bolted to tabs extending around the periphery of the plate. (It may be possible, eventually, to make the track an integral part of the plate.) The track 28 has a uniform cross-section, characterized by V-grooves 30,32 on its top and bottom surfaces. The trapezoidal path has four segments we refer to as the top run, bottom run, uphill (upstream) run, and the downhill run. The rail has an arcuate portion 33 between the bottom and uphill runs.

A regularly spaced series of pairs of jaws 34,35 are carried by the chain around the trapezoidal path. Neighboring fixed jaws 34 are mechanically interconnected by links 36 (FIG. 4) extending between pins on the far sides of the fixed jaws, that is, the sides not visible in FIG. 1.

Each fixed jaw 34 has three identical rollers 38,40 and 42, two of which ride in the outside groove 30 of the track, and one of which rides in the inside groove 32. The inner roller 42 is supported on a pin mounted in a groove 44 on the fixed jaw; an adjustment screw 46 extending through a tab 48 at the inside end of the fixed jaw enables one to control free play of the jaw.

The downstream outer roller on each jaw is supported by a bolt 49 passing through a bushing 50 welded to the jaw and extending from either side thereof. The portion of the bolt protruding through the far side of the bushing supports a roller 52 about the same diameter as the bushing. The roller is retained by a nut and washer at the end of the bolt.

The roller has dual functions of (a) engaging the drive sprocket and, along the top run of the track (b) preventing lateral jaw wobbling. This latter function is provided in conjunction with a stationary bar 51 (FIG. 1B) mounted above the roller path, in the vicinity of the cutting blade.

The geometry of each fixed jaw 34 and its rollers 38,40,42 is such that the trailing edge 53 of the jaw is always substantially perpendicular to the track. Thus, the jaw edge is substantially vertical over the horizontal top run of the path.

A movable jaw 35 is pivotally attached to each of the fixed jaws 34. Each movable jaw has a bushing welded to its far side, and the bolt 48 previously mentioned passes through the bushing. The roller 52 is spaced from the bushing by a plain thrust bearing 54. Each movable jaw has a heel portion 56 projecting downwardly at its upstream end. An actuating pin 58 projects from the far side of the heel.

Over the bottom run of the trapezoidal path, the position of the movable jaw does not matter, and as it rounds the sprocket (FIG. 1A), gravity biases the jaw rearward to a fully open position, ready to receive the neck of a bird. At the top of the uphill run of the monorail track, the actuating pin 58 encounters the leading, downwardly curved tip of a stationary cam rail 60 whose entire upper surface is covered with a UHMW (ultra-high molecular weight) polyethylene edge protector 62.

The cam rail is substantially horizontal, so that it maintains the position of the movable jaw, as it moves along the top run of the path, at about a constant angle, with its leading edge 63 approximately parallel to the trailing edge 53 of the fixed jaw. The height of the camming rail can be altered to adjust the distance between the facing edges of the stationary and movable jaws, which may be necessary if bird size changes. For chickens, the jaws are about ⅜ inch apart when they are parallel and closed, but this dimension could change if the jaws were redesigned for turkeys, for example. The dimension must be smaller than the width of the bird's lower jaw, so that the head cannot be withdrawn, but not so small as to constrict the neck.

The cam rail has three half-inch diameter supporting rods 64 welded to its bottom surface. These, which have threaded tips, pass through holes in UHMW support blocks 66 bolted to the plate on about thirty inch centers. The rods have keepers which receive the top end of strong compression coil springs 68 that are compressed by tightening nuts 70 on the ends of the rods, protruding below the support blocks. The springs protect the machine and its operator by limiting the closing force the jaws can apply.

At the downstream end of the top run, the cam rail ends. It is immediately succeeded by the upper leg of an L-shaped horizontal lever 72 whose apex is pivotally connected to a bracket 74 bolted to the cam rail. The lower leg of this lever is pulled in the downstream direction (tending to pivot the upper leg upward) by a pneumatic tensioning cylinder 78. By using a pneumatic cylinder, as we presently prefer, the biasing force can be remotely altered; however, it would be possible to replace the cylinder with a simple tension spring.

The reason a yieldable lever 72 is provided at this point, to support the jaw actuator pin 58–in lieu of the cam rail –is to allow the movable jaw to pivot backward when a certain low level of resistance is met, which level is much less than would be required to displace the cam rail. This is important to avoid cutting more than the blood vessels in the bird's neck.

The neck incising blade 80 is a circular blade driven by its own independent motor. The top of the blade, which lies substantially in the plane of the plate, turns in the upstream direction, toward the neck. The downstream portion of the blade is confined within a conforming recess in a UHMW stop block 82 fixed to the frame of the machine. The leading vertical face 84 of the stop block limits the exposure of the bird's neck to the blade. That is, it acts as a limit stop for the blade to prevent cutting of the trachea or spinal cord.

It may be observed that the tangential motion of the cutting blade ordinarily would tend to rotate the bird's head –an outcome to be avoided. But, just before the bird encounters the blade, the jaws have begun their downhill run, and are being withdrawn from the level of the bird's neck (maintained by the shaft 86 described below) as the neck cut is made. Therefore, each movable jaw has a downward velocity component, and inasmuch as the movable jaw at this point is pushing the neck into the blade and against the stop, the jaw tends to rotate the head, but in a direction opposite the rotation the blade would produce. So the jaw motion torques the neck in one direction, and the blade produces a torque in the opposite direction. The net rotational force is very low, so that head tends to remain in its optimum orientation.

Figure 3A:
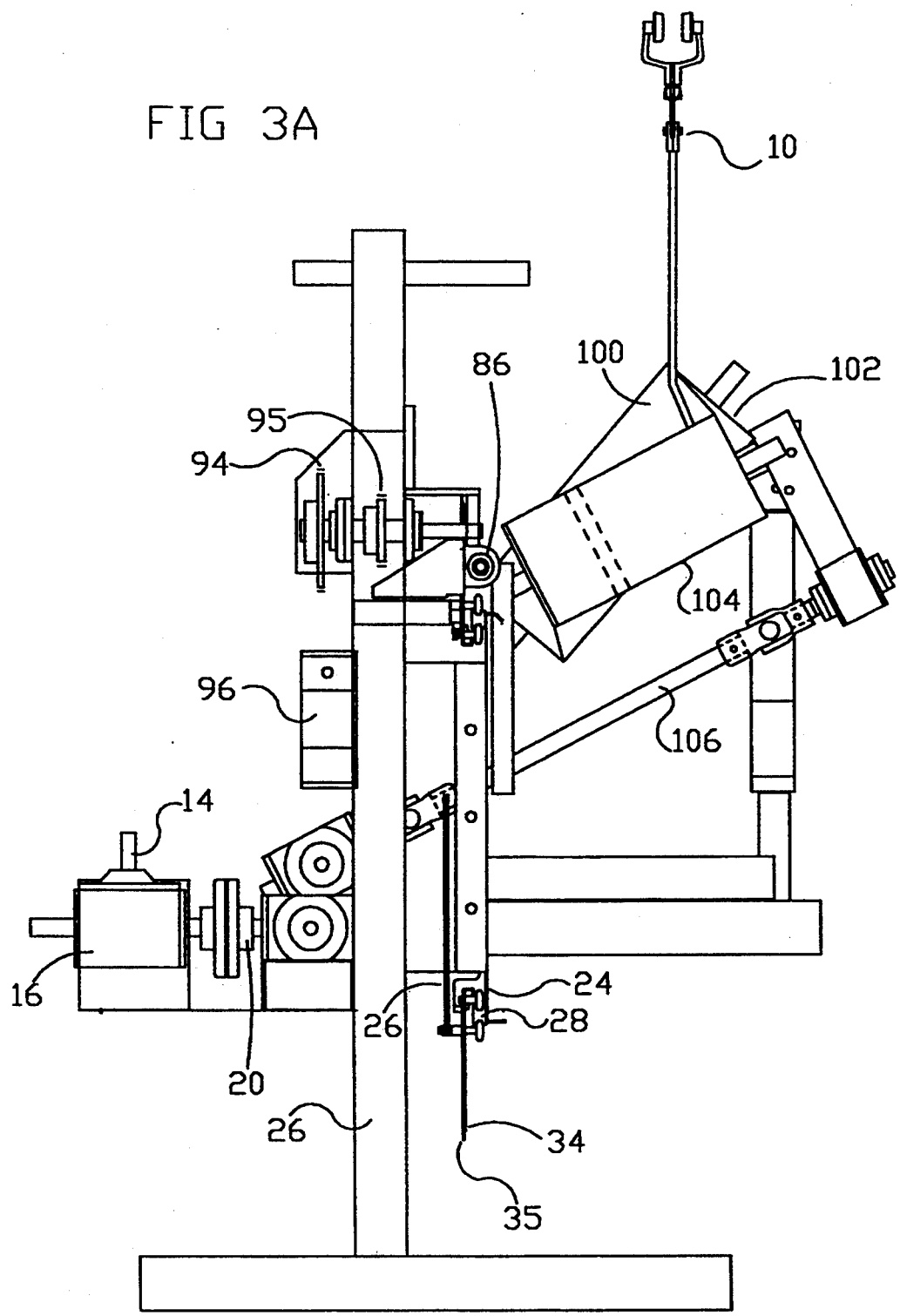
FIG. 3A is an end view of the apparatus, looking in the upstream direction.

Prior to and during cutting, the neck is supported from below by a horizontal rotating shaft 86 (FIGS. 1A, 3B), about ¾ inch diameter, running parallel to and above the monorail, from about the midpoint of the top run to a point downstream of the cutting blade. This shaft also has its own drive 88, which rotates the shaft so that its upper surface moves toward the operator (counterclockwise, in FIG. 3B). The shaft performs two important functions: first, its rotation pulls the neck skin away from the head, better exposing the neck; second, since the neck is dragged along the length of the shaft, even though the shaft is rotating, it exerts a sideways pull on the neck skin as well, in a direction away from the cutting blade. A chicken's trachea is quite flexible, and is readily moved sideways with the neck skin, well away from the blade.

It may be observed that as the bird's neck encounters the blade, the following things happen at once: (1) the shaft maintains the skin facing the blade taught, while protecting the trachea; (2) the jaws, now on the downhill run, have begun to open; (3) the stop block arrests the head, limiting blade penetration, and (4) the movable jaw pushes the neck downward and forward into the corner defined by the shaft and the stop block, but only until the jaw's actuating pin clears the lever.

Now the bird is still suspended by its feet, and must so remain for a while, so it is necessary to release or eject the head from the jaws. To effectuate such release, a synchronous two-toothed ejector wheel 90 is situated adjacent the cutting wheel, in such a position that its blunt teeth 92 sweep through the cutting zone. The ejector wheel is driven by a chains 94,95 from the overhead conveyor. The chain 95 runs through a phase adjuster 96, so that the machine can be adjusted during setup to eject the bird at just the right moment, that is, immediately after the neck cut has been made.

Attention is again directed to FIG. 1A, which shows a twisted, foot-wide belt 100 running below the shackle conveyor, from a point about ten feet upstream of the sprocket to the midpoint of the top run of the head capturing device. The belt runs around an upstream idler drum 102, which has an axis inclined about 25° from vertical, and a downstream drum 104, whose axis is at about 45° to vertical, in a plane transverse to the length of the machine. These angles may vary, but in general, the upstream drum axis is substantially more nearly vertical than the downstream drum axis. The downstream drum is driven from the overhead conveyor by a second power take-off unit 106 geared so that the peripheral speed of the drum is about 8% greater than that of the overhead conveyor. As a result, as the bird comes into contact with the belt, and is increasingly supported by it as the angle of the belt surface deviates more from vertical, the belt tends to rotate the bird. The bird naturally responds by drawing in its wings. This consistent reaction helps keep the wings from interfering with the other parts of the machine.

Since the invention is subject to modifications and variations, it is intended that the foregoing description and the accompanying drawings shall be interpreted as illustrative of only one form of the invention, whose scope is to be measured by the following claims.

I claim:

1. A poultry slaughtering machine comprising
   a shackle conveyor for carrying a series of birds, suspended by their feet in a predetermined orientation with their breasts facing to one side, along a first path,
   a head capturing device disposed generally below the shackle conveyor and offset away from said one side, said capturing device including a flexible carrier constrained to follow an endless second path, a series of pairs of relatively movable jaws affixed to the endless carrier, and means for closing each pair of jaws about the neck of a bird,
   means for supporting the neck from below while it is captured between said jaws,
   a blade for incising major blood vessels of the neck, without cutting the trachea or the spinal cord, and
   means for opening the jaws to release the neck once it has been cut.

2. The invention of claim 1, further comprising a flat belt following an endless loop over a pair of rotatable drums, said belt being disposed beneath the shackle conveyor, for supporting the breast of birds on the conveyor, and directing them toward the head capturing jaws.

3. The invention of claim 2, wherein the drums are disposed on respective axes spaced generally lengthwise of the shackle conveyor, one upstream and one downstream, the upstream drum axis being more nearly vertical than the downstream drum axis, so that the belt increasingly supports the birds' breasts as the birds move downstream, until their heads have been captured.

4. The invention of claim 3, wherein one of the drums is driven at a speed so related to the speed of the shackle conveyor that the belt moves faster than the shackle conveyor and thus tends to rotate each bird's body with respect to its feet, whereby the bird reacts by withdrawing its wings, thus keeping the wings from interfering with the apparatus.

5. The invention of claim 4, wherein the belt speed is about 8% faster than the shackle conveyor speed.

6. The invention of claim 1, wherein said endless path is defined by a generally trapezoidal track having a top run, an uphill run and a downhill run.

7. The invention of claim 6, wherein said track is a monorail track lying in a generally vertical plane, and has opposed V-grooves on opposite sides thereof in said plane.

8. The invention of claim 7, wherein the flexible carrier comprises a series of fixed Daws articulated to one another.

9. The invention of claim 8, wherein the fixed jaws are articulated to one another by connecting links.

10. The invention of claim 8, wherein each of said fixed jaws has at least three wheels for engaging said track, at least one of said wheels riding in each of said V-grooves.

11. The invention of claim 10, wherein each of said wheels has a fixed axis, and one of said axes can be repositioned with respect to the other two, so that free play can be controlled.

12. The invention of claim 7, wherein each of said fixed jaws has a respective movable jaw hinged to it, so that the jaws can open and close, and further comprising means for closing the movable jaw.

13. The invention of claim 12, wherein the closing means comprises an actuating pin projecting from one side of the movable jaw and a stationary cam rail engaged along part of the endless path by the actuating pin, the cam rail having a non-uniform distance from the endless path so that the jaws are moved from an open position along the uphill run of the track to a closed position as they move along the top run of the track.

14. The invention of claim 13, further comprising a deflectable extension at the end of the cam rail which permits the movable jaw to open at a predetermined threshold force when the bird's neck is in contact with the cutting blade, thus permitting withdrawal of the bird following neck incision.

15. The invention of claim 14, further comprising a spring for biasing the deflectable extension toward a rest position, where a surface of the extension is colinear with a corresponding surface of the cam rail.

16. The invention of claim 14, further comprising a pneumatic cylinder for biasing the defectable extension toward a rest position, where a surface of the extension is colinear with a corresponding surface of the cam rail.

17. The invention of claim 14, wherein the deflectable extension is a spring-biased lever pivotally connected to the apparatus.

18. The invention of claim 6, wherein the means for supporting the neck from below comprises a horizontal shaft whose axis is parallel to the top run of the endless path, so that as the bird's neck passes along the shaft, friction displaces the trachea in the upstream direction.

19. The invention of claim 18, further comprising means for rotating the shaft about its axis in a direction away from the jaws so that the shaft displaces neck skin downward from the head towards the body as the incision is made.

20. The invention of claim 6, further comprising a stop block adjacent the cutting blade, for arresting movement of the bird's head to limit depth of the incision.

21. The invention of claim 6, further comprising a kicker wheel having at least one blunt tooth for ejecting the neck vertically from between the jaws immediately after the incision is made, and means for rotating the kicker wheel in synchronization with movement of the jaws.

22. The invention of claim 21, wherein the rotating means comprises a driveshaft having a angularly adjustable coupling.

23. The invention of claim 6, wherein the blade is a circular blade disposed in a plane parallel to that of said track.

24. The invention of claim 23, wherein the blade is rotated in a direction so that it is moving downward where it engages the neck, tending to rotate the neck in a first direction, and the movable jaw is on said downhill run at that point, so that it tends to rotate the neck opposite to said first direction.

25. A method of slaughtering poultry comprising steps of carrying birds by their feet along a predetermined path, progressively supporting the birds' breasts from below as the birds move along the path, capturing the necks of the birds between pairs of relatively movable jaws, moving the jaws toward a cutting blade, sliding the necks of the birds along a neck support as the birds approach the blade, so that the tracheas are displaced away from the blade, and releasing each neck from the jaws as soon as an incision has been made in the blood vessels on one side of the neck.

26. The method of claim 25, further comprising a step of rotating the neck support so that it displaces neck skin from the head toward the body of the bird.

27. The method of claim 25, wherein the breast supporting step is achieved with a twisted belt running at a speed greater than that of the birds' movement along the path.

28. A method of slaughtering poultry comprising steps of advancing the neck of a bird along a line substantially perpendicular to the edge of a knife blade, with the neck oriented so that one jugular vein of the neck is exposed to the blade, physically blocking the neck from moving toward the blade more than necessary to cut the jugular vein, so that neither the trachea nor the spinal column is cut, and then moving the neck away from the blade as soon as the jugular vein has been severed.

29. A method of slaughtering poultry comprising steps of advancing a knife blade toward the neck of a bird, along a line substantially perpendicular to the edge of a knife blade, with the neck oriented so that one jugular vein of the neck is exposed to the blade, physically blocking the blade from moving toward the neck more than necessary to cut the jugular vein, so that neither the trachea nor the spinal column is cut, and then moving the blade away from the neck as soon as the jugular vein has been severed.

* * * * *